A. B. KOKERNOT.
HAT PIN.
APPLICATION FILED FEB. 27, 1912.
1,070,265.
Patented Aug. 12, 1913.
2 SHEETS—SHEET 1.
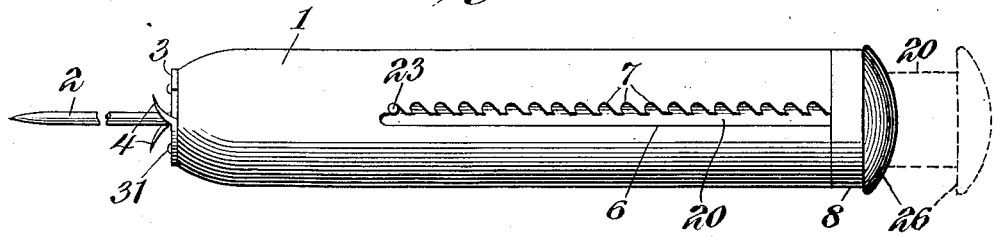
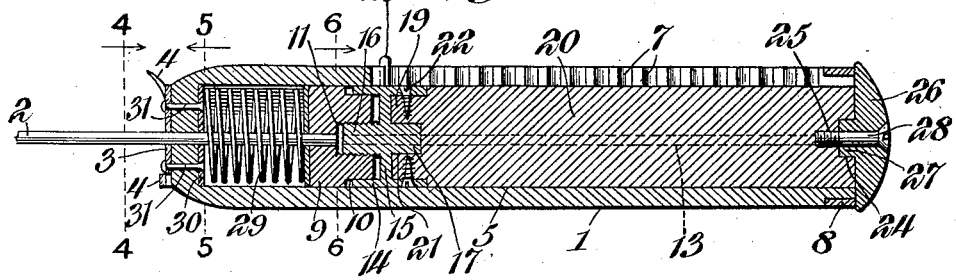
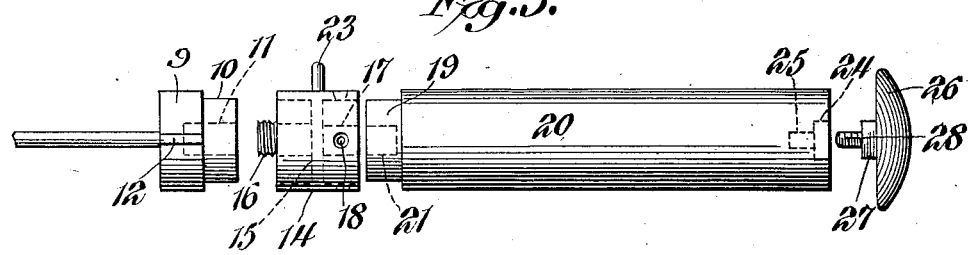
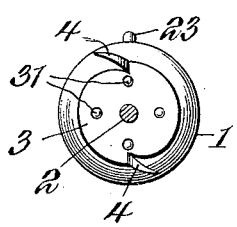 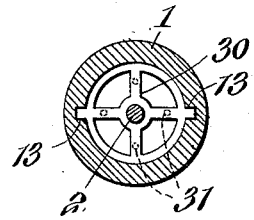 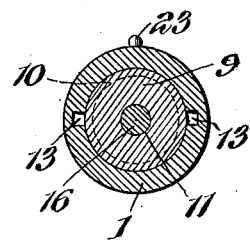
WITNESSES
Howard D. Orr.
F. T. Chapman.
A. B. Kokernot, INVENTOR,
BY
ATTORNEY
COLUMBIA PLANOGRAPH CO., WASHINGTON, D. C.

A. B. KOKERNOT.
HAT PIN.
APPLICATION FILED FEB. 27, 1912.
1,070,265. Patented Aug. 12, 1913.
2 SHEETS—SHEET 2.
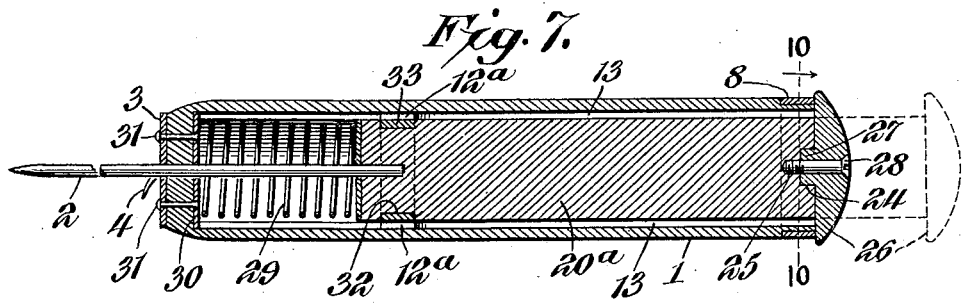
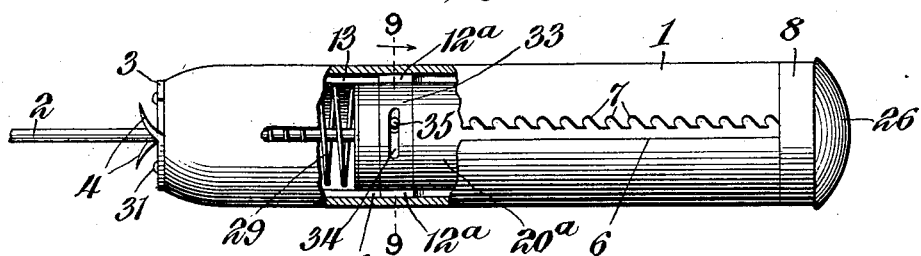
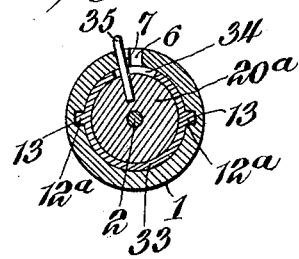 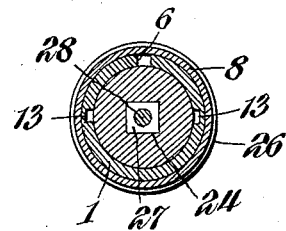
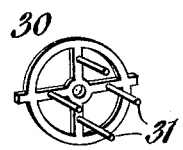 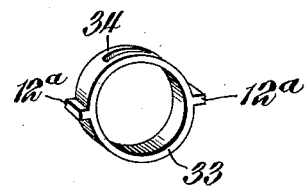
WITNESSES
Howard D. Orr.
F. T. Chapman.
A. B. Kokernot, INVENTOR,
BY E. G. Siggers
ATTORNEY

UNITED STATES PATENT OFFICE.

ALEXANDER B. KOKERNOT, OF NEW ORLEANS, LOUISIANA.

HAT-PIN.

1,070,265.   Specification of Letters Patent.   Patented Aug. 12, 1913.

Application filed February 27, 1912. Serial No. 680,208.

*To all whom it may concern:*

Be it known that I, ALEXANDER B. KOKERNOT, a citizen of the United States, residing at New Orleans, in the parish of Orleans and State of Louisiana, have invented a new and useful Hat-Pin, of which the following is a specification.

This invention has reference to improvements in hat pins and its object is to provide a hat pin which may be shortened or lengthened as needed, and will be positively locked in the adjusted positions, and will automatically assume the elongated position when released from the locking means.

The invention comprises a head member and a shank member in telescoping relation, the shank member being constantly constrained toward the projected position, and means are provided whereby the shank member may be manipulated from the end of the head remote from that entered by the shank member, and furthermore the constraining means for projecting the pin is so arranged as to tend to move the part of the pin controlled thereby into the locked position, so that in order to adjust the pin toward the projected position it must be held against the action of constraining means tending to lock it and released to the action of the same means in a direction to project the pin.

The invention will be best understood from a consideration of the following detailed description, taken in connection with the accompanying drawings forming a part of this specification, and it will be further understood that while practical forms of the invention are disclosed in the drawings, these practical forms are but examples of other practical forms which the invention may assume, wherefore the invention is not limited to any strict conformity with the showing of the drawings.

In the drawings:—Figure 1 is a plan view of a pin constructed in accordance with the present invention. Fig. 2 is a longitudinal central section thereof. Fig. 3 is a displayed view of the movable member of the head of the pin to which member the shank of the pin is secured. Fig. 4 is a section on the line 4—4 of Fig. 2. Fig. 5 is a section on the line 5—5 of Fig. 2. Fig. 6 is a section on the line 6—6 of Fig. 2. Fig. 7 is a longitudinal section of a pin of somewhat modified construction. Fig. 8 is a plan view of the pin shown in Fig. 7 with some parts broken away and in section. Fig. 9 is a section on the line 9—9 of Fig. 8. Fig. 10 is a section on the line 10—10 of Fig. 7. Figs. 11 and 12 are perspective views of details of the invention.

Referring to the drawings, there is shown a head member 1 and a shank member 2, the head member being designed to remain exterior to a hat when the shank member 2 is moved into the hat after the usual manner of applying hat pins. At that end of the head member 1 through which the shank 2 projects there is applied a plate 3 and this plate has at appropriate points, preferably diametrically opposite, spurs 4 so disposed that when the head member is brought into contact with a hat and given a rotative movement about its longitudinal axis, the spurs will enter the hat and draw the plate 3 into engagement therewith, thereby locking the head member to the hat as by a screw, and the head member may be readily removed from the hat by a reverse rotative movement thereof.

The head member 1 is shown as of general cylindrical shape and elongated, and extending throughout the greater portion of the length of the head member is an axial bore 5, so that the head member is in effect a cylindrical shell with the bore opening through the end remote from that to which the plate 3 is applied. While the head member is shown as cylindrical in shape it will be understood that its exterior may be of any desired ornamental shape, either cylindrical or polygonal, or of any configuration which the designer may desire. Extending through one side of the head member longitudinally thereof is a slot 6, one long wall of which is provided with a series of notches 7 shown as regularly disposed, but regularity of spacing of the notches is not mandatory, although preferred. This slot is continued to the end of the head member 1 remote from that to which the plate 3 is applied. At the open end of the head member there is applied a band 8 serving to bind this portion of the head member against spreading.

The head member is designed to receive a carrier for the shank member 2, the carrier being movable longitudinally of the head member considering the latter as being held against movement, and although this shank carrying member is functionally the same in the two structures shown in the drawings, it differs somewhat in construction in the form shown in Fig. 1 and associated figures from that shown in Fig. 7 and associated figures, while in both forms the head member is substantially the same. In the form shown in Fig. 1 and associated figures the pin shank 2 is made fast at the butt end to a cylindrical block 9 having the end remote from the pin reduced in diameter, as shown at 10, and entering this reduced portion axially is a threaded socket 11, while at diametrically opposite points on the enlarged portion of the block 9 there are longitudinal tongues 12, the latter being adapted to similarly placed longitudinal grooves 13 formed in the inner wall of the head member 1. There is also provided a sleeve 14 with a central interior web 15 from one side of which projects a screw 16 adapted to the socket 11, while the reduced portion 10 of the block 9 is adapted to the interior of the sleeve 14 on that side carrying the screw 16. The other side of the web 15 is formed with a plug 17, while that portion of the sleeve about the plug 17 has a suitable number of screw holes 18 formed therein. Adapted to the end of the sleeve carrying the plug 17 is the reduced end 19 of a member 20 adapted to the interior of the head 1 and constituting the main portion of the shank carrying member. The body or main portion 20 of the shank carrying member may be in the form of an elongated solid block, as indicated in the drawings, or otherwise formed, and when the reduced end 19 is introduced into the sleeve 14 the plug 17 enters an axial recess 21 in the reduced portion 19, while screws 22 extending through the screw holes 18 and into the reduced portion 19 serve to hold the parts together, so that the movable member is in effect a single member, although made up of several pieces. Projecting radially from the sleeve 14 is a stud 23 adapted to extend through the slot 6 and engage in any one of the recesses 7. That end of the body member 20 remote from the reduced portion 19 is formed with a socket 24 having a threaded continuation 25 axial to the body member 20, and adapted to the end of the body member 20 containing the socket 24 is a cap block 26 having a central extension 27 shaped to enter the socket 24 and by making both the extension 27 and the socket 24 of square or other non-circular shape the cap member 26 is prevented from turning relative to the body member 24. The cap is secured to the body member by a screw 28 which may extend axially through the cap 26 and the extension 27 and enter the threaded extension 25. The length of the body member is such that when the cap member 26, which is of sufficient diameter for the purpose, engages the end of the body member 1 remote from that entered by the shank 2, the block 9 is close to the end of the head 1 traversed by the shank 2, and the pin or stud 23 traversing the slot 6 is in engagement with that recess 7 nearest to the said end of the head traversed by the shank 2. Fast to the block 9 is one end of a spring 29 and the other end of this spring is fast to a plate 30 preferably, though not necessarily, of skeleton type, which plate is traversed by the shank 2 and carries a suitable number of short pins 31 extending through appropriate passages in that end of the head member 1 traversed by the shank 2, and through matching passages in the plate 3, outside of which the pins 31 are headed, thereby constituting rivet connections holding the skeleton plate 30 in engagement with the corresponding end of the head 1. The normal tendency of the spring 29 is to maintain the movable member with the cap 26 against the corresponding end of the head 1, but this spring will yield to a suitable force permitting the cap member to be moved away from the head 1, the shank carrier comprising the body 20, the sleeve 14 and the block 9 following, this resulting in the indrawing of the shank 2 with respect to the head 1, while the spring 29 is extended by this operation. The spring 29 is also so arranged as to be under some torsional stress, wherefore it tends constantly to rotate the shank carrying member in a direction to force the stud 23 into a recess 7 and to there maintain it so that in order to withdraw the stud 23 from a recess, the shank carrying member must be given a slight rotative movement in opposition to the normal tendency of the spring 29. All the recesses 7 are inclined toward the end of the head member 1 carrying the plate 3, and, therefore, the combined retractive and twisting action of the spring 29 maintains the stud 23 firmly in a notch 7.

The structure shown in Fig. 7 and associated figures differs from that shown in Fig. 1 and associated figures only in that end of the movable member carrying the shank where the shank is attached, and the description of the other parts with particular reference to Fig. 1 and associated figures applies with equal force to the structure shown in Fig. 7 and associated figures and the same reference characters in so far as they apply are used throughout. In the structure shown in Fig. 7 and associated figures there is a body member $20^a$ corresponding to the body member 20 of the previously described construction, and this body member $20^a$ receives the butt end of the pin shank 2 at one end, wherefore in this construction the member $20^a$ becomes the shank carrier or shank carrying member. Close to that end of the body member 20ª receiving the pin shank 2 there is formed a circumferential groove 32 in which is lodged a ring 33 provided with a short circumferentially arranged slot 34 and with diametrically opposed tongues 12ª corresponding to the tongues 12 of the previously described construction. Extending through the slot 34 is a stud 35 radiating from the body member 20ª at a point about midway of the length of the groove 32, and this stud extends through the slot 6 in the head 1 and engages in any one of the recesses 7.

In the position of the parts shown in Figs. 1, 2 and 7, 8 the shank 2 is in the position of greatest projection with reference to the head 1 and the operator by properly grasping the head 1 may force the shank 2 through a hat until the prongs 4 are brought into engagement with the hat, when a slight twist of the head in the proper direction will cause these prongs to anchor in the hat, thereby holding the pin securely in position against accidental displacement. If the length of the shank 2 with relation to the breadth of the hat is suitable, then the pin may be used as an ordinary non-adjustable hat pin. Suppose, however, that the shank 2 is too long for the particular hat, then the operator by grasping the cap 26 which has its margins sufficiently projecting beyond the head 1 to admit of grasping, pulls upon the cap 26, while at the same time holding the head 1 and simultaneously giving the cap 26 a slight twist to unseat the stud 23 or 35 as the case may be from the notch 7 with which it is engaged. Pulling on the cap 26 in the proper direction causes the expansion of the spring 29 against its normal tendency until the shank 2 has been retracted to the desired extent, when the cap 26 may be turned or allowed to turn under the action of the spring 29 in the proper direction to cause the stud carried by the body member to enter the desired one of the notches 7, whereupon the pin with the protruding shank shortened is ready for application to the hat in a manner already described.

The hat pin of the present invention is adapted for use where the point of the shank 2 does not protrude through the side of the hat remote from that where it enters the hat, but is brought into engagement with a suitable resisting medium which may simply consist of the wall of the hat if sufficiently resistant. Under such circumstances the spring 29 will yield to permit a movement of the head 1 along the shank 2 until the prongs 4 may be brought into engaging relation with the hat and then by a twisting motion the head 1 is locked to the hat with the pin under slight longitudinal strain sufficient to prevent the movement of the head 1 along the shank, and the pin is therefore securely locked to the hat, although readily removed therefrom by a purposely applied manipulation of the pin structure.

What is claimed is:—

1. A hat pin comprising a head member and a shank member in telescoping relation one to the other, the shank member being provided with a carrier extending through the head member to that end thereof remote from the end entered by the shank member and there provided with a manipulating means exterior to the head member, and the shank carrier and head member having coacting locking means for holding the shank member in different positions of protrusion with reference to the head member, and a spring within the head member between and at the respective ends connected to the end of the head member entered by the shank member and the end of the carrier to which the shank member is attached, said spring having a normal tendency to contract and thereby protrude the shank member from the head member.

2. A hat pin comprising an elongated head member having an axial bore, a shank member entering one end of the head member, a carrier for the shank member normally within the bore of the head member and movable therealong and provided at that end remote from the end carrying the shank member with a cap exterior to the head member, the end of the carrier adjacent to the end of the head member through which the shank member projects stopping short thereof, a spring within the head member in surrounding relation to the shank member and lodged within the space between the carrier and the corresponding end of the head member, said spring being connected at its respective ends to the head member and carrier and tending normally to maintain the shank member in the projected position, and coacting locking means on the head member and the carrier for the shank.

3. A hat pin comprising a head member and a shank member in telescoping relation one to the other, a carrier for the shank located normally within the head member, locking means for holding the shank and its carrier with the shank in different positions of projection with respect to the head member, said locking means comprising a stud movable with the shank carrier, and a series of notches on the head member into and out of engagement with which the stud is movable, and a spring connected at one end to the shank carrier and at the other end to the head member and having a normal tendency to move the shank carrier together with the stud in a direction to project the shank member and also to rotate the carrier to move and hold the stud in engagement in a notch.

4. A hat pin comprising a head member and a shank member in telescoping relation, a carrier for the shank member normally within the head member, the said carrier and head member having coacting locking means and the carrier being movable longitudinally and rotatively within the head member, and a spring within the head member having a normal tendency to move the carrier longitudinally of the head member to project the shank member and rotatively with respect to the head member to engage the locking means.

5. A hat pin comprising a head member and a shank member in telescoping relation one to the other, the head member being provided with a longitudinal slot with a series of recesses at one side of the slot opening thereinto, and a carrier for the shank member movable both longitudinally and rotatively within the head member and provided with a locking member entering the slot in the head member and movable therefrom into a chosen one of the recesses.

6. A hat pin comprising a head member and a carrier in telescoping relation one to the other, said head member and carrier having coacting locking means and capable of relative rotative movement about the longitudinal axis of the pin, a shank member entering one end of the head member and there made fast to the carrier, and a spring lodged in the head member between the carrier and that end of the head member traversed by the shank member, said spring being connected at one end to the head member and at the other end to the shank carrier and having a normal tendency in two directions, one to project the shank member and the other to cause engagement of the locking means.

7. A hat pin comprising a head member having a longitudinal bore, a longitudinal slot communicating with said bore and provided along one side with a series of recesses, said head member having at one end engaging members for securing the head member to a hat, a shank member entering the end of the head member provided with a hat engaging means, a carrier for the shank member normally lodged within the bore of the head member and capable of both longitudinal and rotative movements therein, said carrier being provided with a stud adapted to travel in the slot and engage in any chosen one of the notches and at the end remote from that carrying the shank member with a cap exterior to the head member, and a spring within the head member between the carrier and the end of the head member entered by the shank member and acting on the carrier to move the same within the head member to project the shank and to impart rotative movement to the carrier to cause engagement of the locking means.

8. A hat pin comprising a hollow head member having at one end engaging spurs for securing the head member to a hat, a shank member, a carrier adapted to the interior of the head and provided at one end with a cap exterior to the head and adapted to engage the end of the head remote from the spurs, the head member being provided with a longitudinal slot having a series of recesses at one side entering the slot, and the carrier being provided with a stud adapted to travel in the slot and enter in one of the recesses, and a spring within the head member fast at one end to said head member and at the other to the carrier and having a normal tendency to move the carrier to project the shank member and to rotate the carrier to move the stud into a recess.

In testimony, that I claim the foregoing as my own, I have hereto affixed my signature in the presence of two witnesses.

ALEXANDER B. KOKERNOT.

Witnesses:
H. W. CRAWFORD,
J. LEHMANN.

---

Copies of this patent may be obtained for five cents each, by addressing the "Commissioner of Patents, Washington, D. C."